May 21, 1929.　　　　N. H. DAVIS　　　　1,713,999

VELOCIPEDE

Filed Nov. 9, 1926　　　2 Sheets-Sheet 1

WITNESS
F. J. Hartman.

INVENTOR
Nathan H. Davis.
BY John D. Meyers
ATTORNEY

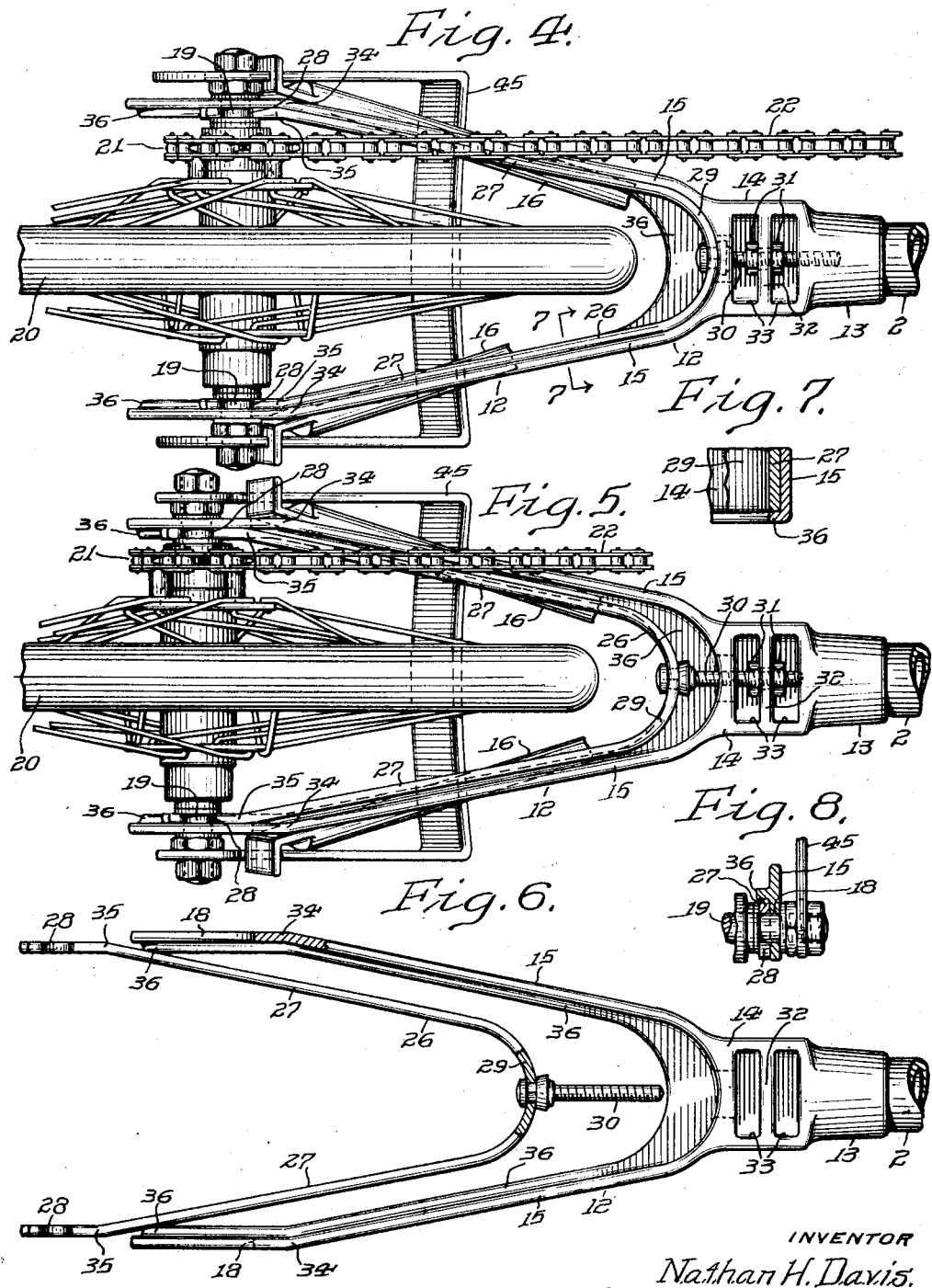

Patented May 21, 1929.

1,713,999

UNITED STATES PATENT OFFICE.

NATHAN H. DAVIS, OF PHILADELPHIA, PENNSYLVANIA, ASSIGNOR TO KEYSTONE LANTERN COMPANY, A CORPORATION OF NEW JERSEY.

VELOCIPEDE.

Application filed November 9, 1926. Serial No. 147,215.

My invention relates to velocipedes in general and provides certain new and useful improvements in their construction, which are particularly adapted for use in the bicycle type thereof, and which serve to maintain the rear axle at all times in proper position or alinement in both horizontal and vertical planes.

One object of the invention is to provide improved means for adjusting the rear wheel in the frame relatively to the crank-shaft to take up slack in the driving chain so that the latter may be kept running at the proper tension.

In the usual construction this is accomplished by providing at the ends of the rear fork, draw-bolts which engage the opposite ends of the rear axle to adjust its position. Such an arrangement is objectionable in that it requires the independent adjustment of the draw-bolts, which is troublesome and difficult to regulate to secure accurately the corresponding movement of both ends of the axle, and hence is likely to result in throwing the axle and wheel out of proper alinement in the frame.

With my invention this difficulty is eliminated and both ends of the axle are simultaneously and correspondingly adjusted without disturbing the proper alinement of the axle in a horizontal plane. Furthermore, the adjustment may be effected with facility, while the means employed are simple, reliable and not likely to get out of order and do not impair the strength and durability of the frame.

Another object of the invention is to provide improved means for mounting the crank-shaft so as to relieve the backbone of certain tortional stresses to which it is subjected during pedaling when the crank-shaft is located above or below the backbone in the customary manner, whereby to minimize both the danger of breakage and also the possibility of twisting the back-bone, canting the rear fork to one side or the other and throwing the rear axle out of alinement in a vertical plane.

With these and other objects in view, the invention comprises the various novel features of construction, arrangement and combinations of parts, herein set forth and pointed out in the appended claims.

In the accompanying drawings illustrating one embodiment of the invention and in which similar letters of reference indicate similar parts,—

Fig. 4 is an enlarged fragmentary bottom plan view of the rear fork and wheel.

Fig. 5 is a similar view showing the inner or adjusting fork regulated to take up slack in the driving chain.

Fig. 6 is an enlarged bottom plan view partly in section showing rear fork and its inner or adjusting fork in juxtaposition.

Figure 1:
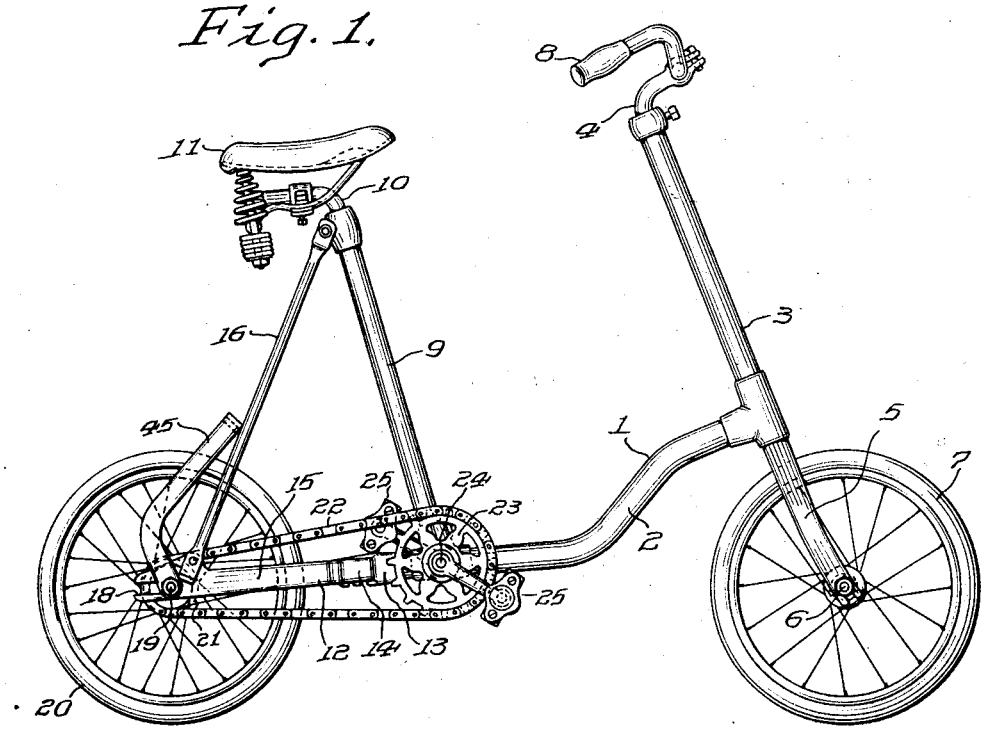
Fig. 1 is a side elevation of a bicycle embodying my invention.
Figure 2:
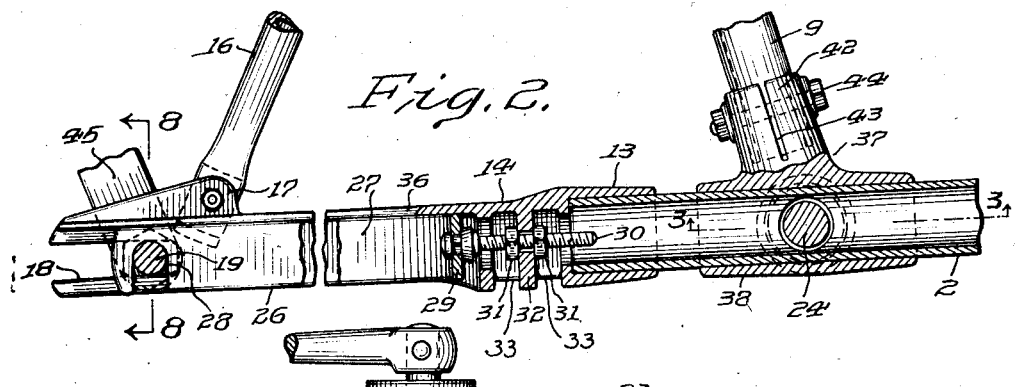
Fig. 2 is an enlarged fragmentary longitudinal section of the rear portion of the frame.

Figs. 7 and 8 are detail sectional views taken respectively on the lines 7—7 of Fig. 4 and 8—8 of Fig. 2.

In the present embodiment of my invention the bicycle comprises a frame 1 having a longitudinally disposed lower member or backbone 2, preferably of tubular form, rigidly secured at its front end to a tubular steering-head 3. A steering post 4 is rotatably mounted in the steering-head and carries at its lower end a front fork 5, the sides of which support the axle 6 of a front wheel 7. At its upper end the steering post is equipped with a handlebar 8 by means of which the front wheel is turned.

The backbone is inclined rearwardly and downwardly from the steering head with its rear portion preferably substantially straight. Supported on and upstanding from the rear portion of the backbone is a seat column 9 which receives and has adjustably mounted therein a seat post 10 carrying a saddle 11.

The backbone projects rearwardly beyond the seat column and has a rear fork 12 rigidly secured to its rear end in any suitable manner, as, for instance, by a tubular shank or socket member 13 extending forwardly from the crown 14 of the rear fork and fitted on the backbone. The sides 15 of the rear fork project rearwardly from the crowd in transversely spaced relation with the axis of the fork preferably in substantial longitudinal alinement with the rear portion of the backbone. In order to reinforce the frame a pair of braces 16 are secured to the upper end of the seat column 9 and are inclined downwardly therefrom and fastened respectively to lugs 17 upstanding from the rear ends of the sides 15 of the fork 12.

Corresponding longitudinal slots 18 are formed in the rear ends of the sides 15 and receive and provide bearings for the ends of the axle 19 of the rear wheel 20, so that the same are afforded limited longitudinal movement in the rear fork and yet are supported thereby both vertically and laterally with respect to the frame. The slots preferably open outwardly through the extremities of the fork for convenience in assembling the parts.

The rear wheel is driven in the usual manner and has a sprocket wheel 21 engaged by a chain 22 which passes around another sprocket 23 fixed on a transverse crank-shaft 24 that is journaled in the frame and provided with pedals 25.

In order to shift the rear wheel in the frame relatively to the crank-shaft 24 to take up slack in and regulate the tension on the driving chain 22, I provide an inner or adjusting fork 26 which coacts with the rear fork 12 and conforms to the contour thereof so as to fit snugly therein. The inner fork embraces the rear wheel and has its sides 27 formed at their rear ends with apertures 28 through which the ends of the axle 19 pass and in which they are snugly fitted. These apertures preferably open outwardly through the lower edges of the sides 27 so that the extremities of the latter are in the form of downwardly facing hooks which may be readily engaged with the axle.

Projecting longitudinally forwardly from the crown 29 of the inner fork is a threaded stem 30 which telescopes with the crown 14 of the outer fork 12. The crown 14 is hollow and houses one or more nuts 31 threaded on the stem 30. In the present instance there are two of such nuts located on opposite sides of a web or wall 32 which extends transversely within the crown and through which the stem passes freely, the nuts being screwed against such wall to hold the stem against longitudinal movement. Openings 33 are formed through the periphery of the crown 14, preferably on the under side thereof, adjacent to and on opposite sides of the wall 32 to afford access to the interior of the crown for the manipulation of these nuts.

The manner of operating the nuts will be obvious and it will be seen that the inner fork 26 may be conveniently and positively shifted longitudinally thereby, simultaneously and correspondingly to adjust both ends of the rear axle 19 in the slots 18 to keep the driving chain running at the required tension. When shifting the inner fork either forwardly or rearwardly one nut serves to make the adjustment and the other nut is thereafter screwed home to lock the stem in adjusted position.

The sides 15 and 27 of the outer and inner forks 12 and 26 preferably diverge rearwardly, but have their rear end portions offset as indicated at 34 and 35 respectively, and disposed longitudinally in parallel relation. The opposed faces of such offset portions of the outer fork 12 form guide surfaces with which the outer faces of the offset portions of the inner fork 26 are in abutting contact and on which they ride in the adjustment of the inner fork. The inner fork is thus effectively braced at all times against lateral stresses.

The outer fork 12 is also formed along its upper edge with an inwardly directed flange 36 which overhangs and contacts with the upper edge of the inner fork 26, both to brace the same vertically and guide it in its longitudinal movement, the flange being relatively wide adjacent to the crown 14 so as to overlap the crown 26 in the different adjusted positions of the inner fork. The inner fork is thus substantially housed and protected from accidental injury as well as being practically concealed from view. The flange 36 prevents the hooked ends of the inner fork from being sprung upwardly out of engagement with the rear axle after the parts have been assembled.

Figure 3:
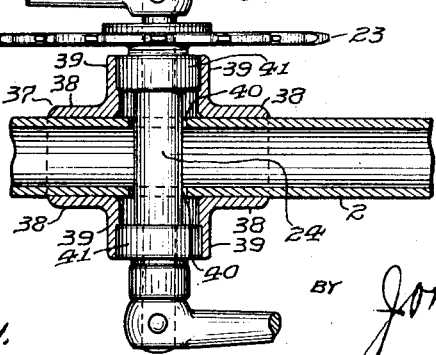
Fig. 3 is an enlarged horizontal section on the line 3—3 of Fig. 2 showing the mounting of the crank-shaft.

The crank-shaft 24 is mounted in a crank-bracket or hanger 37, consisting of two tubular members 38 and 39, which intersect at right angles so that the hanger is substantially cruciform in horizontal section as shown in Fig. 3. The tubular member 38 is disposed lengthwise of the frame and constitutes an attaching sleeve which is fitted on the rear portion of the backbone 2, with the latter passing entirely therethrough and projecting rearwardly therebeyond to receive the shank 13 of the fork 12. The tubular member 39 projects transversely on both sides of the backbone and forms a housing for the crank-shaft 24, which extends freely through alining openings 40 in the backbone and is journaled in ball-bearings 41 fitted within the ends of the tube 39. The hanger is also formed with a tubular coupling member 42 upstanding from the tubes 38 and 39, adjacent to the intersection thereof, and receiving the lower end of the seat column 9, which is rigidly secured therein. For this purpose the coupling member may be split as indicated at 43 and clamped around the steering column by means of a bolt 44.

With the foregoing construction the crank-shaft is supported substantially on the center line of the rear portion of the backbone, which is thus relieved of certain tortional stresses which occur during pedaling when the crank-shaft is journaled above or below the backbone in the usual manner, whereby to minimize both the danger of breakage and also the possibility of twisting the back-bone, canting the rear fork to one side or the other, and throwing the rear axle out of alinement in a vertical plane. The elimination of these stresses is particularly important in a bicycle of the form illustrated in which there is no upper bar or brace connecting the steering post and the seat column. Moreover, with this straight line drive the stretches of the driving chain are equi-distant above and below the rear fork and hence are prevented from striking the same which is likely to happen with the driving shaft mounted above or below the backbone and out of line with the same and rear fork.

A U shaped hanger or stand 45 of well known form may be pivoted on the extremities of the rear axle 19 to support the bicycle in upright position when it is not in use, the stand being adapted to be swung upwardly above the rear wheel to an inoperative position. As the means for adjusting the rear axle are entirely housed within the rear fork the stand in no wise interferes therewith nor do they interfere with the movement of the stand from operative to inoperative position or vice versa, as required.

The improved means for adjusting the rear axle and the improved means for mounting the crankshaft, coact to maintain the rear axle at all times in proper position or alinement in both horizontal and vertical planes. While I have found that their conjoint use, therefore, produces the best results, they may, however, be employed separately, if desired.

It will be apparent that the herein described improvements may be usefully embodied in various forms of bicycles and other types of velocipedes. Furthermore, it is to be understood that the adjusting fork may be mounted on the outside, instead of the inside, of the coacting fork of the frame, that the arrangement of the adjusting screw and nuts may be varied and other suitable adjusting means employed, and that the tubular shank or socket member of the rear fork may be formed integral with the attaching sleeve of the crank-hanger. Various other changes may also be made in the form, arrangement and combinations of parts, without departing from the spirit and scope of the invention as defined in the appended claims.

Having thus described my invention, I claim and desire to protect by Letters Patent of the United States:

1. In a device of the character described, the combination with a fork and an axle supported by and movable relatively to the sides thereof, of an adjusting fork coacting with said first mentioned fork and engaging the ends of said axle, and means for moving said adjusting fork relatively to the other fork simultaneously to adjust both ends of the axle.

2. In a device of the character described, the combination with a fork formed with slots and an axle supported in said slots, of another fork coacting with said first mentioned fork and engaging the ends of said axle, and an adjustable connection between said forks for simultaneously adjusting the axle in said slots.

3. In a device of the character described, the combination with a fork formed with slots and an axle supported in said slots, of another fork coacting with and movable relatively to the first mentioned fork and engaging the ends of the axle, and a screw threaded connection between the crowns of said forks.

4. In a device of the character described, a pair of coacting forks fitting one within the other, one of said forks being formed in its sides with slots adapted to receive and support an axle, the other fork being relatively movable and being adapted to engage the ends of the axle opposite said slots, and an adjustable connection between said forks.

5. In a device of the character described, the combination with a fork formed in its sides with corresponding longitudinal slots, and an axle supported in said slots, of an adjusting fork coacting with said first mentioned fork and having its sides engaged with the ends of said axle opposite the respective slots, and means for moving said adjusting fork longitudinally relatively to said first mentioned fork.

6. In a device of the character described, the combination of a fork having its sides formed with corresponding slots and with lateral guide surfaces adjacent said slots, an axle extending between the sides of the fork and supported in the slots thereof, an adjusting fork coacting with said first mentioned fork, and means for moving said adjusting fork relatively to said first mentioned fork in the direction of said slots, the sides of said adjusting fork engaging the ends of the axle and abutting against and riding on the said guide surfaces.

7. In a device of the character described, the combination of a pair of coacting forks fitting one within the other, one of said forks being formed in its sides with longitudinal slots adapted to receive and support an axle, and the other fork being relatively movable and having its sides adapted to engage the axle opposite said slots, and a longitudinally adjustable connection between said forks, the sides of one of said forks being formed with a longitudinal flange engaging the sides of the other fork.

8. In a device of the character described, the combination with a backbone and a rear fork secured to the rear end thereof, of a crank-hanger mounted on the backbone in front of the rear fork, the backbone being formed with an opening extending transversely therethrough, a crank-shaft passing transversely through said opening and journaled in the crank-hanger on opposite sides of the backbone, an axle mounted in and movable longitudinally of the sides of said fork, an adjusting fork engaging the ends of said axle, and a longitudinally adjustable connection between said forks.

In testimony whereof, I have hereunto set my hand this 8th day of November, A. D. 1926.

NATHAN H. DAVIS.